US009152847B2

(12) United States Patent
Zhou et al.

(10) Patent No.: US 9,152,847 B2
(45) Date of Patent: Oct. 6, 2015

(54) FACIAL LANDMARK LOCALIZATION BY EXEMPLAR-BASED GRAPH MATCHING

(71) Applicant: Adobe Systems Incorporated, San Jose, CA (US)

(72) Inventors: Feng Zhou, Pittsburgh, PA (US); Jon Brandt, Santa Cruz, CA (US); Zhe Lin, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 401 days.

(21) Appl. No.: 13/686,737

(22) Filed: Nov. 27, 2012

(65) Prior Publication Data

US 2014/0147022 A1 May 29, 2014

(51) Int. Cl.
*G06K 9/00* (2006.01)
(52) U.S. Cl.
CPC .................................. *G06K 9/00281* (2013.01)
(58) Field of Classification Search
CPC .................................................. G06K 9/00281
USPC ........................................................ 382/118
See application file for complete search history.

(56) References Cited

U.S. PATENT DOCUMENTS

| 6,876,755 | B1* | 4/2005 | Taylor et al. | 382/115 |
| 7,970,181 | B1* | 6/2011 | Brandt | 382/117 |
| 8,565,493 | B2* | 10/2013 | Ryu | 382/115 |
| 2006/0093208 | A1* | 5/2006 | Li et al. | 382/159 |
| 2008/0052312 | A1* | 2/2008 | Tang et al. | 707/104.1 |
| 2009/0116749 | A1* | 5/2009 | Cristinacce et al. | 382/195 |
| 2010/0150459 | A1* | 6/2010 | Coulombe et al. | 382/232 |
| 2010/0246980 | A1* | 9/2010 | Tong et al. | 382/228 |
| 2012/0155717 | A1* | 6/2012 | Ma et al. | 382/118 |
| 2012/0230570 | A1* | 9/2012 | Zheng et al. | 382/131 |
| 2014/0050358 | A1* | 2/2014 | Liu et al. | 382/103 |
| 2014/0147022 | A1* | 5/2014 | Zhou et al. | 382/118 |
| 2014/0185924 | A1* | 7/2014 | Cao et al. | 382/159 |

* cited by examiner

*Primary Examiner* — Gandhi Thirugnanam
(74) *Attorney, Agent, or Firm* — Kilpatrick Towsend & Stockton LLP

(57) ABSTRACT

Systems and methods are discussed to localize facial landmarks using a test facial image and a set of training images. The landmarks can be localized on a test facial image using training facial images. A plurality of candidate landmark locations on the test facial image can be determined. A subset of the training facial images with facial features similar to the facial features in the test facial image can be identified. A plurality of shape constraints can be determined for each test facial image in the subset of test facial images. These shape constraints graphically relate to one landmark location from a linear combination of the other landmark locations in the test facial image. Shape constraints can be determined for every landmark within each test facial image. A candidate landmark can be chosen from the plurality of candidate landmarks using the shape constraints.

6 Claims, 9 Drawing Sheets

FACIAL LANDMARK LOCALIZATION BY EXEMPLAR-BASED GRAPH MATCHING

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

FIELD

This disclosure relates generally to facial recognition. In particular, the present invention relates to techniques to improve landmark localization in non-ideal facial images.

BACKGROUND

Localizing facial landmarks can be an important component in many computer vision applications such as face recognition, facial expression recognition, face reconstruction, and re-targeting. Many approaches have been proposed with varying degree of success on benchmark datasets composed by mostly frontal images in controlled setting. However, accurate localization of facial landmarks in real-world, cluttered images is still a challenge due to a number of factors. FIGS. 1A-1E show examples of facial images that create facial recognition challenges. FIG. 1A shows an example of a facial image in a non-ideal pose. The face is looking down relative to the camera. FIG. 1B shows an example of a facial image with unusual expression. FIG. 1C shows an example facial image with illumination varying across the face. The left side of the face is well illuminated and the right side of the face is in shadow. FIG. 1D shows an example of a facial image with a portion of the face occluded. In this image the left eye is occluded by a hat. FIG. 1E shows an example of a low quality image. In this example, the face is out of focus. Each of these examples, among others, pose challenges to facial recognition techniques.

SUMMARY

Embodiments of the invention include a method for determining a plurality of shape constraints. The method includes receiving a test facial image. A subset of training facial images can be determined from a plurality of training facial images. The subset of training facial images can have a greater similarity with the test facial image than a plurality of training facial images not within the subset of training facial images. Each training facial image, for example, within the subset of training facial images can include a plurality of previously identified facial landmarks. The method can also include determining a plurality of shape constraints for each landmark within each training facial image within the subset of training facial images. The plurality of shape constraints can include a plurality of weights that reconstructs each landmark location within a given facial image from a plurality of other landmark locations within the given training facial image.

Embodiments of the invention also include a method for localizing candidate points in a test facial image. For instance, in some embodiments a set of shape constraints and a set of candidate landmarks can be used to localize candidate landmarks in a test facial image. The method can include receiving a test facial image and receiving a set of training facial images. A plurality of shape constraints can be determined for each landmark within each training facial image within the set of training facial images. A plurality of candidate landmark locations can be determined for each landmark within the test facial image. Then one of the candidate landmark locations can be determined or localized for each landmark within the test facial image from the plurality of shape constraints and the plurality of candidate landmark locations.

Embodiments of the invention also include computer-readable medium on which is encoded program code for localizing a test facial image. The program code can include program code for receiving a test facial image and program code for receiving a set of training facial images. The program code can also include program code for determining a plurality of shape constraints for each landmark within each training facial image within then set of training facial images. The program code can also include program code for determining a plurality of candidate landmark locations for each landmark within the test facial image can also be include. The program code can also include program code for determining one of the candidate landmark locations for each landmark within the test facial image from the plurality of shape constraints and the plurality of candidate landmark locations.

Embodiments of the invention also include a system including a database having a plurality of training facial images stored therein, memory, and a processor coupled with the database and the memory. The processor can execute code for receiving a test facial image and identifying a subset of training facial images from the plurality of training facial images. The subset of training facial images have a greater similarity with the test facial image than the plurality of training facial images not within the subset of training facial images. Each training facial image within the subset of training facial images includes a plurality of previously identified facial landmarks. The processor can execute code for determining a plurality of shape constraints for each landmark within each training facial image within the subset of training facial images. The plurality of shape constraints can include a plurality of weights that reconstructs each landmark location within a given facial image from a plurality of other landmark locations within the given training facial image.

Embodiments of the present disclosure provide methods and systems for localizing facial landmarks in a test facial image. In some embodiments, a set of training facial images can be used to localize candidate points within a test facial image. A subset of training facial images can be identified from a plurality of training facial images. The subset of training facial images may have a greater similarity with the test facial image than the plurality of training facial images not within the subset of training facial images. Each training facial image within the subset of training facial images can include a plurality of previously identified facial landmarks.

A plurality of shape constraints can be determined for each landmark within each training facial image within the subset of training facial images. The plurality of shape constraints can comprise a plurality of weights that reconstruct each landmark location within a given facial image from a plurality of other landmark locations within the given training facial image.

In some embodiments a method and system for localizing candidate points are disclosed. A test facial image and a set of training facial images can be input and/or retrieved from memory. A plurality of shape constraints can be determined for each landmark within each training facial image within the set of training facial image. A plurality of candidate landmark locations for each landmark within the test facial image can be determined. At least one of the candidate landmark locations for each landmark within the test facial image can be determined from the plurality of shape constraints and the plurality of candidate landmark locations.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are disclosed to localize facial landmarks in a test facial image using a set of training images. In some embodiments a plurality of shape constraints can be identified in a subset of the training images. These shape constraints can be used, for example, to localize optimal facial landmarks. Shape constraints define each facial landmark location as a linear combination of the other facial landmark locations. For instance, the location of one landmark can be written as a linear combination of the other landmark locations (or a subset thereof). A test facial image can be any image of a face for which some type of facial recognition is being sought.

Figure 1A:
FIGS. 1A-1E show examples of facial images that are challenging for facial landmark localization.
Figure 1B:
Figure 1C:
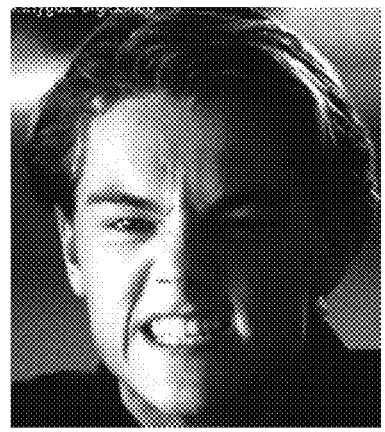
Figure 1D:
Figure 1E:
Figure 2:
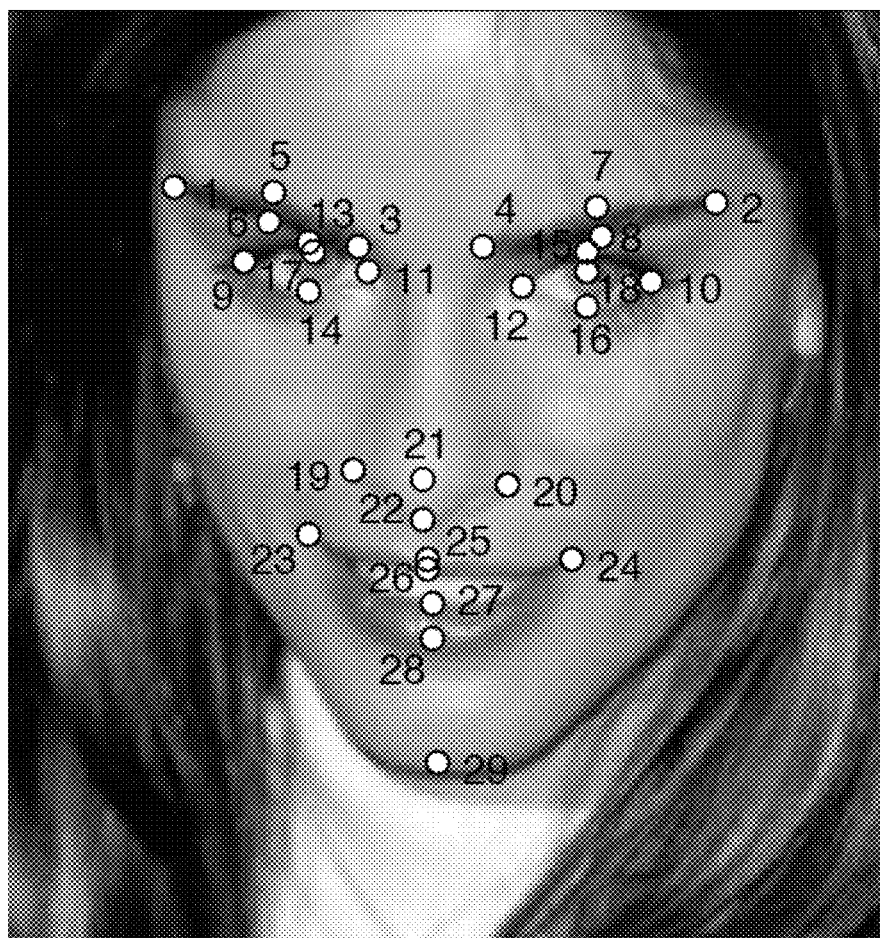
FIG. 2 shows an example of a facial image with landmarks identified by number.

A facial landmark location (or landmark) is a standard reference point on the face that can be used in various facial recognition techniques. Facial landmark locations can represent specific facial characteristics and may be identified by pixel coordinates. Examples of facial landmarks may include eye and mouth corners, top and bottom of inner and outer lips, eyelids, and eyebrows, nose tip, and chin. FIG. 2 shows an example of a facial image with facial landmarks identified and labeled with landmark numbers. One typical facial landmark scheme uses twenty-nine facial landmarks, which are identified and labeled in the figure. Various other facial landmark location and identification schemes can be used.

Figure 3:
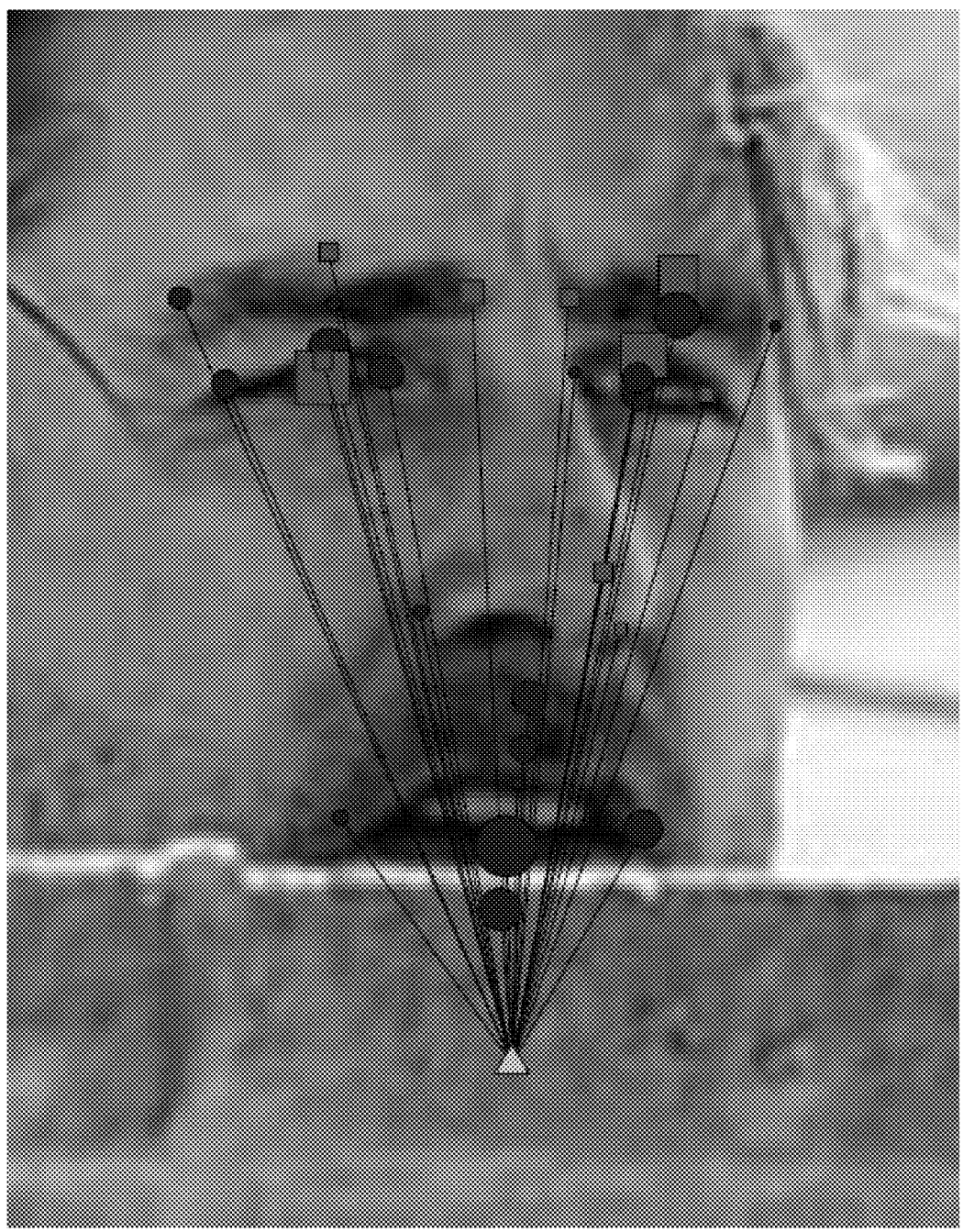
FIG. 3 shows an example of a graphical representation of weights associated with shape constraints.
Figure 3:
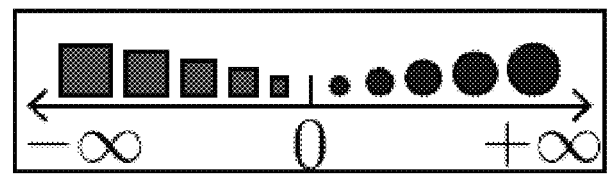

FIG. 3 shows an example, of the shape constraints for the chin facial landmark. Each shape constraint is represented by a weight that is shown graphically in the figure. In this example, each weight represents the contribution of the landmark location to the linear combination that specifies the chin landmark location. The weight of each landmark is represented graphically by the size of the point shown in the figure. The larger the weight, the greater the influence the facial landmark has on the location of the chin landmark. The square points indicate that the landmark has a negative weight and the circle points indicate that the landmark has a positive weight on the reconstruction of the chin landmark. Thus, the left mouth landmark has a small positive influence on the location of the chin landmark, and the bottom lip landmark has a large positive influence on the location of the chin landmark.

In some embodiments shape constraints can be an affine invariant representation of each landmark within a facial image based on the location of the other landmarks. That is, one landmark location in a facial image can be represented by a linear combination of the other landmarks in the facial image regardless of the pose or rotation of the face.

Some embodiments of the invention include methods and systems that identify shape constraints from a set of exemplar images and/or a set of candidate landmarks, which is described in more detail below. Some embodiments of the invention use the shape constraints and a set of candidate landmarks to localize facial landmarks on a test facial image.

Figure 4:
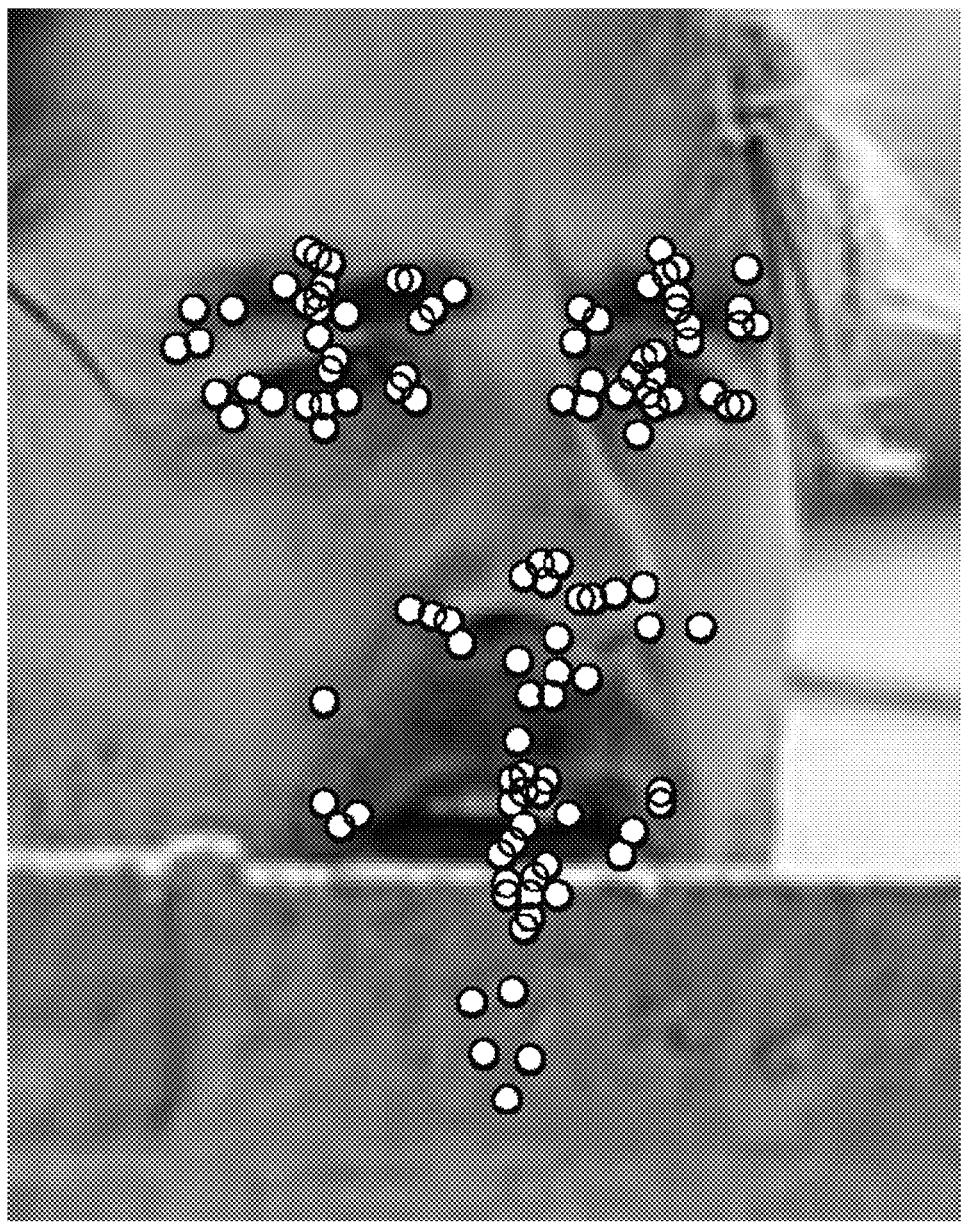
FIG. 4 shows an example of a set of candidate landmarks.

FIG. 4 shows a set of candidate landmarks identified on a test facial image. The set of candidate landmarks shown in the figure includes a number of candidate landmarks for each actual landmark. Each of the candidate landmarks has a high probability of identifying the actual facial landmark. In some embodiments, candidate landmarks can be determined using a random sample consensus (RANSAC) method, which is described below. RANSAC is an iterative method that can be used to estimate landmarks from a set of training images, some of which contain outliers. Various other algorithms and/or methods can also be used.

In some embodiments the shape constraints shown in FIG. 3 and the set of candidate landmarks shown in FIG. 4 can be used to localize the optimal (or estimated) landmarks of the test facial image.

Figure 5:
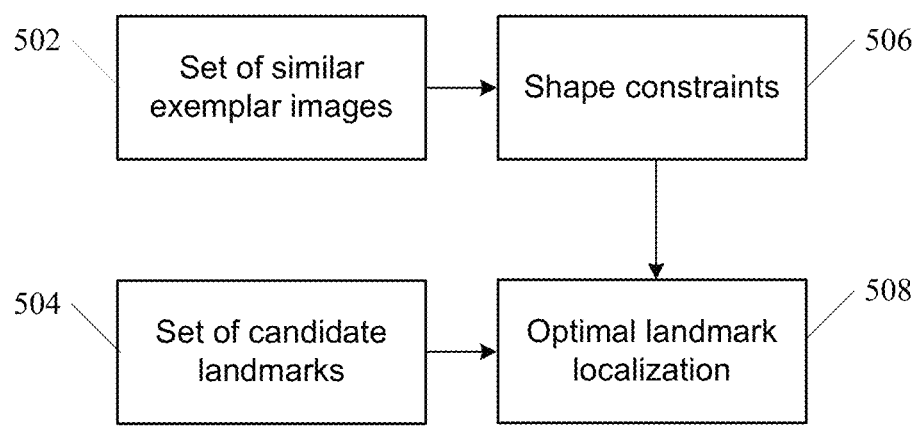
FIG. 5 is a flowchart showing the flow of data resulting in optimal landmark localization according to some embodiments of the invention.

FIG. 5 is a flowchart showing data flow resulting in optimal landmark localization according to some embodiments of the invention. A set of candidate landmarks 504 and a set of similar facial exemplars 502 are inputs. From the set of similar facial exemplars 502, a set of shape constraints 506 can be determined. From both the shape constraints 506 and the set of candidate landmarks 504, optimal landmarks 508 can be localized.

A set of candidate landmarks 504 is also input. Candidate landmarks 504 are points within the test facial image that have a high probability of corresponding to an actual landmark. Candidate landmarks can be estimated using any technique. A set of candidate landmarks includes a plurality of estimated candidate landmarks for each landmark in a test facial image. For instance, a set of candidate landmarks includes a plurality of candidate chin landmarks (29), a plurality of candidate left corner of left eye brow landmarks (1), etc. The set of candidate landmarks can be determined from a response map. The plurality of candidate landmark positions can be composed of points obtained by any landmark detectors trained offline (e.g., through mode selection from detector response maps) or points projected from training exemplars by geometric transformation or the union of the two sets.

A set of similar facial exemplars 502 are input. Similar facial exemplars are a subset of training images that have properties similar to those of the test facial image such as in rotation, scale and/or translation. In some embodiments these can only include those that are similar in rotation and/or translation. In some embodiments, the set of facial exemplars 502 are those face images with very similar point locations to the test face after you apply in-plane rotation, scale and translation For example, if the test facial image includes a face rotated to the left, then the subset of training images will likewise include facial images of a face rotated to the left. As another example if the test facial image includes a face angled downward, then the subset of training images will likewise include facial images of a face rotated downward. The subset of training images may include those images of faces with a similar magnitude of angular rotation. As another example, if the test facial image includes a small face, then the subset of training images will likewise include facial images with a small face. As yet another example, if the test facial image includes a face aligned to the right within the image, then the subset of training images will likewise include facial images similarly aligned to the right. In some embodiments, the subset of training images can include facial exemplars that are the most similar with the test facial image. In some embodiments, a fixed number of similar facial exemplars can be selected from a set of training images. In some embodiments, training images that have a similarity score above a threshold can be used.

In some embodiments, candidate landmarks and similar facial exemplars can be determined using a random sample consensus (RANSAC) method. RANSAC is an iterative method that can be used to estimate landmarks from a set of training images, some of which contain outliers.

In some embodiments, candidate landmarks and similar facial exemplars can be returned using the RANSAC algorithm. In this algorithm, two random regions of the test facial image can be selected. Regions can be defined as groups of landmarks; for example, the 29 landmarks can be divided into 7 groups: left eyebrow, left eye, right eyebrow, right eye, nose, mouth and chin. Two random landmarks can then be selected within each region. For example, the left eyebrow can be selected as the region, and the left corner of the left eyebrow and the right corner of the left eyebrow can be selected as landmarks within the region. Various other regions can be selected. The selection of regions can occur either automatically or manually. Two positions ($q_{c1}$ and $q_{c2}$) can be selected that rank top-l in the corresponding response maps, where $c_1$ and $c_2$ are the landmark indexes, where $c_1$ and $c_2$ are the landmark indexes.

A response map indicates the likelihood that a pixel within an image corresponds with a landmark. Each pixel in the image has an element in the response map for one or more landmarks. In some embodiments the candidate locations can be determined from peaks in a response map that results from evaluating a classifier, specific to a particular landmark, at every point in the input image, or at a subset of locations in the input image. The subset is based on the most likely locations of the given landmark given the initial face detection location and size.

Second, a random training image can be selected. In this random training image $p_{c1}$ and $p_{c2}$ correspond with the landmark positions in the training image. The optimal scale (s) and rotation ($R \in \mathbb{R}^{2\times 2}$) can be computed, for example, by solving: $q_{c_2} - q_{c_1} = sR(p_{c_2} - p_{c_1})$.

Third, each of the k annotated landmarks in the training image can be rescaled and rotated ($P=[p_1, \ldots, p_k] \in \mathbb{R}^{2\times k}$) in the training image to generate the candidate points for the testing image as $q_c = sR(p_c - p_{c1}) + q_{c1}$. The quality of the exemplar is measured by the sum of local responses. This can be calculated, for example, using the following equation: $v(P) = \Sigma_{c=1}^{k} \log(r_c(q_c))$.

Fourth, the above steps can be repeated r times and the best exemplars picked from each of the repeated process. That is the m best exemplars $\{P^i\}_{i=1}^{m}$ can be used as the similar facial exemplars. In this example, $p^i$ is the set of candidate landmarks 504, and the images associated with these candidate landmarks, $P^i$, comprise the set of similar exemplar images.

Shape constraints 506 can be determined based on both the set of exemplar images and the set of candidate landmarks. Shape constraints are affine invariant representations of each landmark based on the location of the other landmarks. That is, one landmark in a facial image can be determined based on a linear combination of the other landmarks in the facial image. The shape constraints can comprise the weights applied to each of the other landmarks to determine a single landmark. Thus, each landmark can be graphically represented by the other landmarks using the shape constraints. For instance, a single landmark, $p_c$, can be determined from a linear combination of the other landmarks: $p_c = P w_c$, where P represents the k-1 other landmarks, and $w_c$ represents the contribution (or weight) of each of the other landmarks.

This shape constraint relationship can be affine invariant. An affine invariant transformation is a transformation that preserves the ratio of distances between points along a straight line. In facial recognition, such transformations allow for changes in facial pose without altering the relationship of the various landmarks. The affine invariance of the shape constraints can be shown mathematically. An affine transformation can be represented by $\tau(p) = Ap + b$, where A is any nonsingular 2×2 matrix. The similarity transforms are subsets of affine transformations. Similarity transforms can limit A to be representing uniform scaling and rotation only. For any similarity transformation, $\tau(p) = sRp + b$, where s represents scaling, R represents rotation, and b represents translation, the new point $p_c$ can still be determined from the other points: $\tau(p_c) = \tau(P) w_c$.

The weights for each landmark within a set of exemplar images can be determined in a number of ways. For example, for the m exemplar faces determined above ($P_1, P_2, P_m$), each of the shapes consist of k 2-D landmarks: $P^i = [p_1^i, p_2^i, \ldots, p_k^i] \in \mathbb{R}^{2\times k}$, where $p_c^i \in \mathbb{R}^2$ is the position of the $c^{th}$ landmark from the $i^{th}$ exemplar.

For each landmark, the optimal weight vector $w_c$ can be found that minimizes the sum of reconstruction errors over all the exemplar faces:

$$\min_{w_c \in \mathbb{R}^K} \sum_{i=1}^{m} \|P^i w_c - p_c^i\|_2^2 + \eta \|w_c\|_2^2, \quad (1)$$

$$\text{s.t.} \quad w_c^T 1_k = 1 \text{ and } w_{cc} = 0, \quad (2)$$

where $\eta \|w_c\|_2^2$ is a regularization term that penalizes the scarcity of the weight vector. This term may distribute the weight equally over all the landmarks. This can be helpful because, for example, when a landmark has a poor local response its neighbor landmarks may likewise have a poor local response. More weighted help can then be provided from more distant landmarks.

The minimization function can be solved using any technique that solves the quadratic problem for optimal $w_c$. Any number mathematical solvers (e.g., the Matlab QP solver) can be used. After solving for each of the k landmarks, the joint matrix comprising the shape constraints can be determined as $W=[w_1, w_2, \ldots, w_k] \in \mathbb{R}^{k \times k}$, where k is the number of landmarks. This defines the interrelationships of the landmarks in terms of weights.

The minimization equation shown above is designed, for example, to minimize a joint reconstruction error from the set of exemplar images. Moreover, in some embodiments the graph of landmark weights can be fully connected between the landmarks and/or the weights equally distributed among the landmarks.

The shape constraints and the candidate landmarks can be used to determine the optimal landmarks 308 that can be localized. This can be done using any number of techniques. For instance, the shape constraints and the graph structure defined by the candidate landmarks can be matched to find an optimal landmark location.

In some embodiments, the global coordinate matrix for all candidate points can be denoted as $Q=[Q^1, Q^2, \ldots, Q^5] \in \mathbb{R}^{2 \times n}$, where $Q^c \in \mathbb{R}^{2 \times n_c}$ is the candidate set for the $c^{th}$ landmark and $n = \Sigma_{c=1}^{k} n_c$. In this formulation the n candidate points belong to different landmarks. This can be encoded by a binary association matrix, $G \in \{0,1\}^{k \times n}$, where $g_{ci}=1$ if $i^{th}$ point belongs to the $c^{th}$ landmark. The feature cost matrix can be denoted as $A \in \mathbb{R}^{k \times n}$, where $a_{ci}=-\log(r_c(q_i))$ indicates the cost of assigning $i^{th}$ candidate point to $c^{th}$ landmark.

In some embodiments, the optimal candidate point can be determined as a correspondence between candidate points and the landmark that minimizes the following score of global inconsistency:

$$\min_X \lambda tr(AX^T) + \|QX^T(I_k - W)\|_1 \qquad (3)$$

$$\text{s.t. } X1_n = 1_k, X \in [0, 1]^{k \times n}, \qquad (4)$$

$$x_{ci} = 0, [c, i] \in \{[c, i] \mid g_{ci} = 0\}. \qquad (5)$$

where $X \in \{0,1\}^{k \times n}$ denotes the correspondence for candidate points. Equation (4) indicates that X is a many-to-one mapping. Equation (5) indicates that the optimal landmark can only come from the candidate locations.

In some embodiments, the optimal candidate point can be determined as follows:

$$\min_{X,U,V} \lambda tr(AX^T) + \sum_{i=1}^{m} 1_2^T(U+V)1_k \qquad (6)$$

$$\text{s.t. } QX^T(I_k - W) = U - V, \qquad (7)$$

$$U, V \geq 0_{2 \times k}, \qquad (8)$$

$$X \in [0, 1]^{k \times n}, \qquad (9)$$

$$x_{ci} = 0, [c, i] \in \{[c, i] \mid g_{ci} = 0\}. \qquad (10)$$

where $U, V \in \mathbb{R}^{2 \times k}$ are auxiliary variables.

Figure 6:
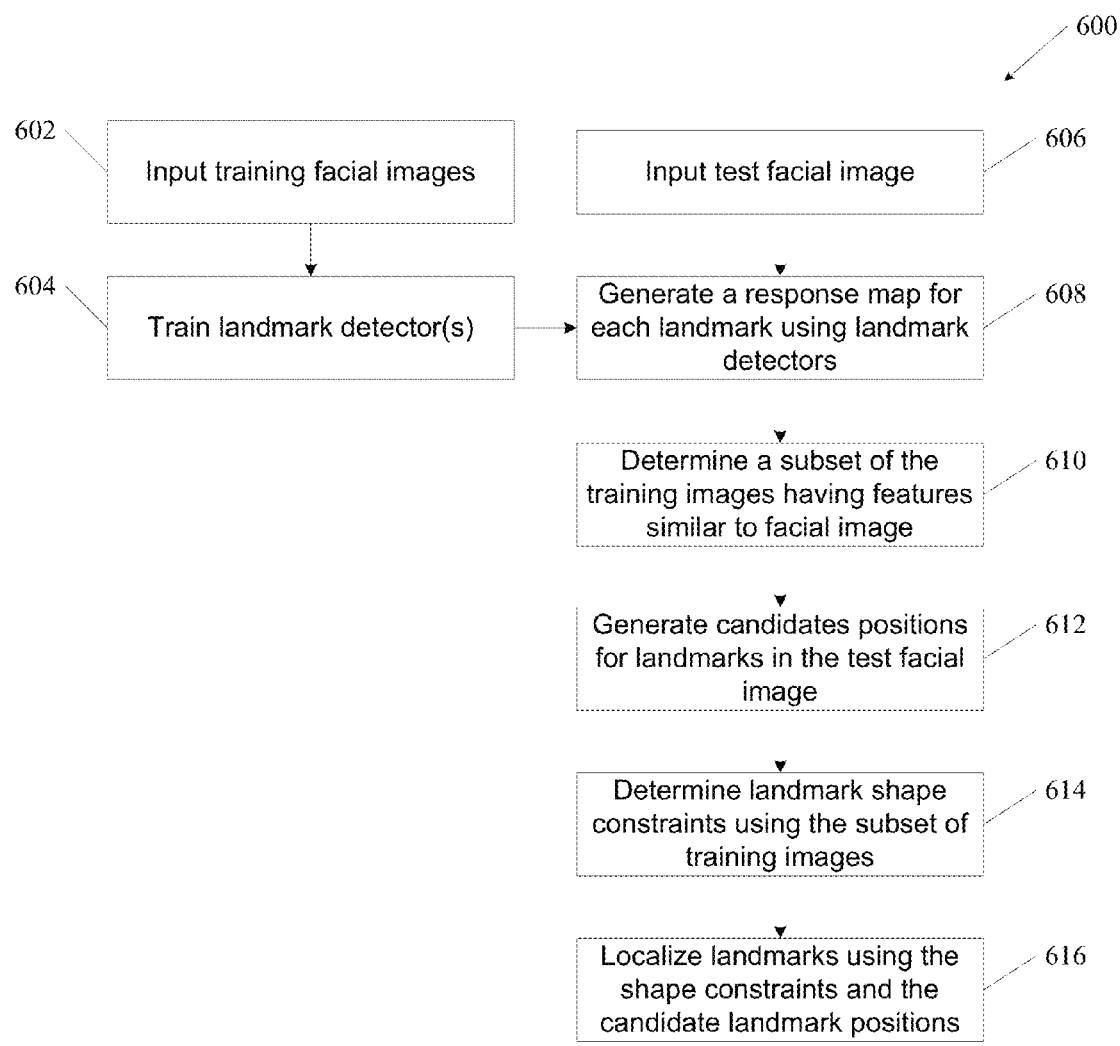
FIG. 6 is a flowchart of a method for determining optimal landmark localization according to some embodiments of the invention.

FIG. 6 is a flowchart showing method 600 for determining optimal landmark localization according to some embodiments of the invention. At block 602 training facial images can be input. The training facial images (block 602) and/or test facial image (block 606) can be input in a number of ways. The training images can be read from a storage location such as a hard drive (e.g., storage devices 625), from a network storage location (e.g., an online database), or any other digital storage location.

At block 604, landmark detectors can be trained using the training facial images input at block 602. This can include various other preprocessing or image condition processes. For example, in some embodiments a support vector regressor can be used for this training. In some embodiments, the scale of the images can be normalized by constraining the inter-ocular distance. For example, the inter-ocular distance can be scaled to 55 pixels. Any other inter-ocular distance can be used.

In some embodiments, for each landmark, a number (e.g., three) of positive patches can be sampled at the ground-truth position with random rotations (within ±20°). A number (e.g., six) of negative patches can also be sampled at least 4 pixels away from the noted location. A number of different patching schemes can be implemented. For example, there can be two types of negative patches. Some patches can be sampled uniformly across the entire image. Other patches can be sampled close to the ground-truth position in order to make the detector more discriminative in the local area.

Each patch can be represented, for example, by the RootSIFT descriptor with two or more different scales (e.g., 7 and 14 pixels). Although RootSIFT can be used because of its superior performance over traditional SIFT without increasing processing time, SIFT may also be used. In some embodiments the features can be extracted via any number of processes; for example, the VLFeat toolbox.

At block 606 a test facial image can be input and a response map for each landmark within the test facial image can be determined at block 608. For example, the landmark detectors developed in block 604 can be run in a sliding window manner to generate a response map for each landmark.

At block 610 a subset of training images can be found having features similar to those in the test facial image. For example, a similar facial exemplar can have similar rotation, scale and/or translation as the test facial image. In some embodiments, a fixed number of similar facial exemplars can be selected from a set of training images. In some embodiments, training images that have a similarity score above a threshold can be used.

At block 612 candidate landmark positions in the test facial image can be generated by searching through the exemplar images. In some embodiments, candidate landmark positions and similar facial exemplars can be determined using a random sample consensus (RANSAC) method. RANSAC is an iterative method that can be used to estimate landmarks from a set of training images, some of which contain outliers.

At block 614 landmark shape constraints can be determined from the subset of training images. Shape constraints can be determined as described above in conjunction with FIG. 3. At block 616, a specific candidate landmark can be localized from the set of candidate landmarks using the shape constraints.

Embodiments of the invention can also be implemented in a cloud computing environment. For example, a test facial image can be identified in a remote storage location and/or in a cloud storage location. A plurality of test facial images can also be identified in a remote storage location and/or in a cloud storage location. Various process, steps, or blocks described herein can be performed utilizing a processor and/or computational system remote from the remote storage location and/or cloud storage location. In some embodiments, different process, steps, or blocks can be performed by different processors and/or computational systems.

For example, a set of candidate landmark locations can be identified using a processor remote from or local with the storage location of the test facial image. The test facial image, for example, can be copied or moved to a storage location of the processor determining the candidate points. As another example, the subset of training facial images can be selected using a processor remote from or local with any of the storage locations storing any of the training facial images. As yet another example, the shape constraints can be determined for each training facial image within the subset of training facial images a processor remote from or local with any of the storage locations storing any of the training facial images. As yet another example, landmark locations(s) can be localized using a processor remote from or local with any of the storage locations storing any of the training facial images.

In some embodiments a support vector regressor (SVR) can be used to determine the landmarks within a facial image. In some embodiments this support vector regressor can be a sliding-window detector. In some embodiments the support vector regressor can use the RootSIFT algorithm.

In some embodiments the support vector regressor can include a number of steps. In a pre-processing step, the scale of the images can be normalized by constraining the interocular distance between pupils. This distance can be set at any value, for example, at 55 pixels. For each landmark, a number of positive patches (e.g., three patches) can be sampled at the ground-truth position with random rotations (within ±20°); and a number of negative patches (e.g., six) can be sampled at least 4 pixels away from the location.

Figure 7:
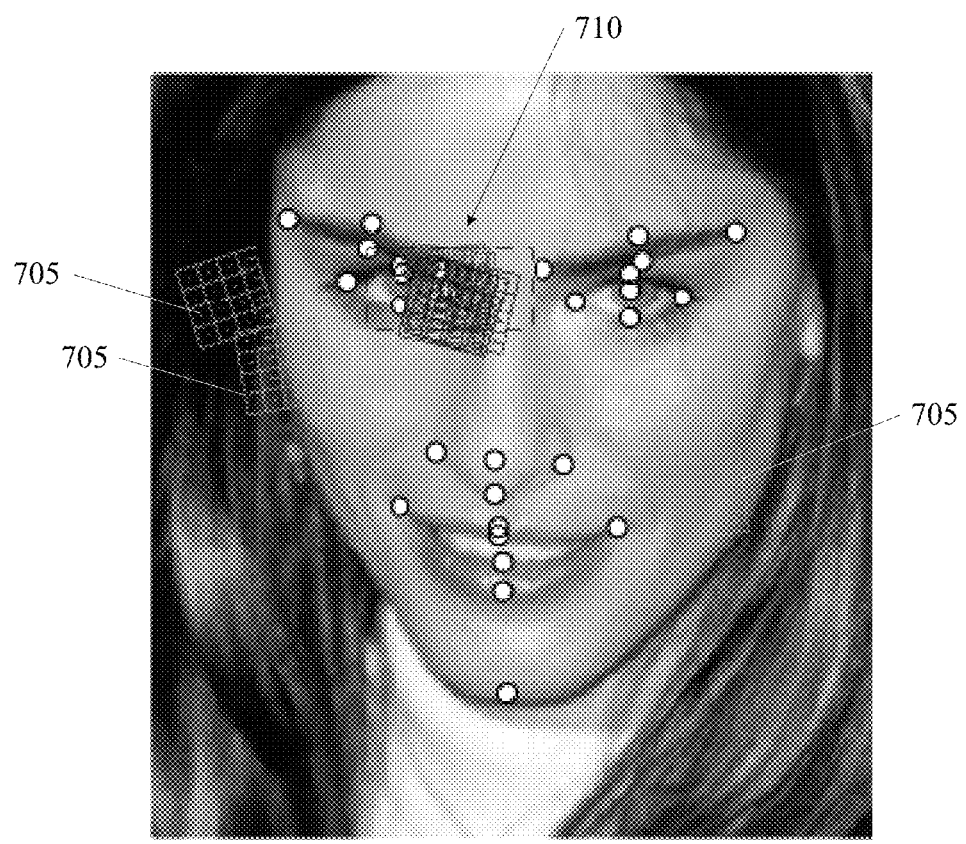
FIG. 7 shows an example of a facial image using three positive patches and six negative patches in a support vector regressor according to some embodiments of the invention.

FIG. 7 shows an example of a facial image using three positive patches 710 (red) and six negative patches 705 and 710 (blue). The first three negative patches can be sampled uniformly across the entire image and shown as green patches 705. The other three negative patches are shown as blue patches 710 and can be sampled close to the ground-truth position, which may help the detector be more discriminative. The feature can be extracted using the VLFeat toolbox.

Each positive and negative patch can be represented by a RootSIFT descriptor with two different pixel-wise scales (e.g., 7 and 14 pixels). For example, the can be used RootSIFT because of its superior performance over traditional SIFT algorithm without increasing processing time.

To obtain the local response for each individual land-mark within a test facial image, the learned detector can be applied on the test facial image by performing a sliding-window scan. In some embodiments there may be no need to scan the entire image. Instead, to constrain the scanning area, an estimate for each landmark can be made with a probability of the landmark's potential position given the bounding box of the face. For example, all the training images can be centered at the center of their bounding box. The prior probability for each landmark can be computed as a 2-D Gaussian distribution for each group of landmarks in the training data.

The value of local response, $r_c(q)$, can indicate the likelihood that the $c^{th}$ landmark is located at point q in the image. This score can be normalized to behave like a probability by dividing by the sum of the response in the bounding box of face area.

The local response can be used to generate candidate points for each landmark. The candidate points, for example, can be chosen based on their large local response value. This can be done by applying the RANSAC algorithm, described above, to find similar test facial images.

Figure 8D:
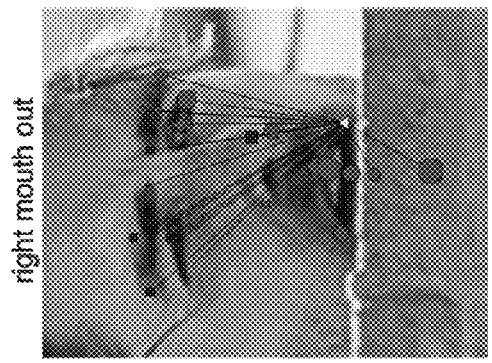
FIGS. 8A, 8B, 8C and 8D show examples of a graphical representation of weights associated with shape constraints.
Figure 8C:
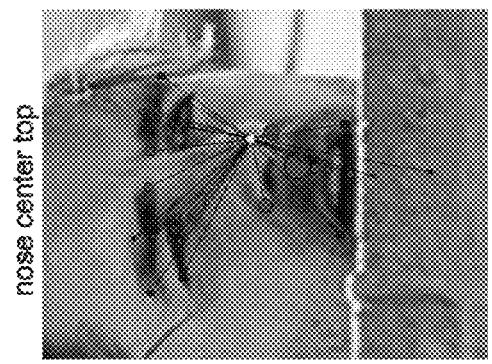
Figure 8B:
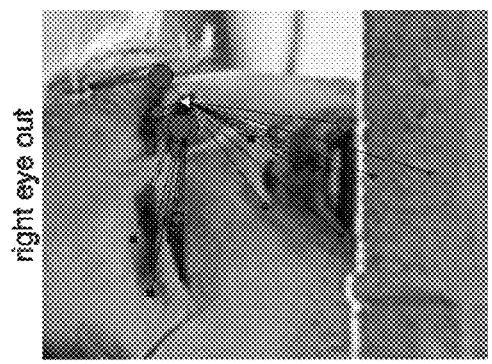
Figure 8A:
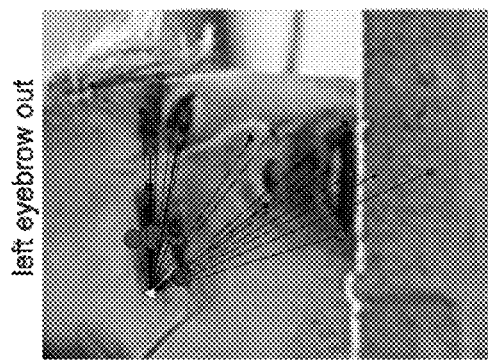

FIGS. 8A, 8B, 8C and 8D show more graphical examples of shape constraints. FIG. 8A shows the shape constraints for left corner of the left eyebrow. FIG. 8B shows shape constraints for the right corner of the right eye. FIG. 8C shows the shape constraints for the tip of the nose. And FIG. 8D shows the shape constraints for the right corner of the mouth.

Figure 9:
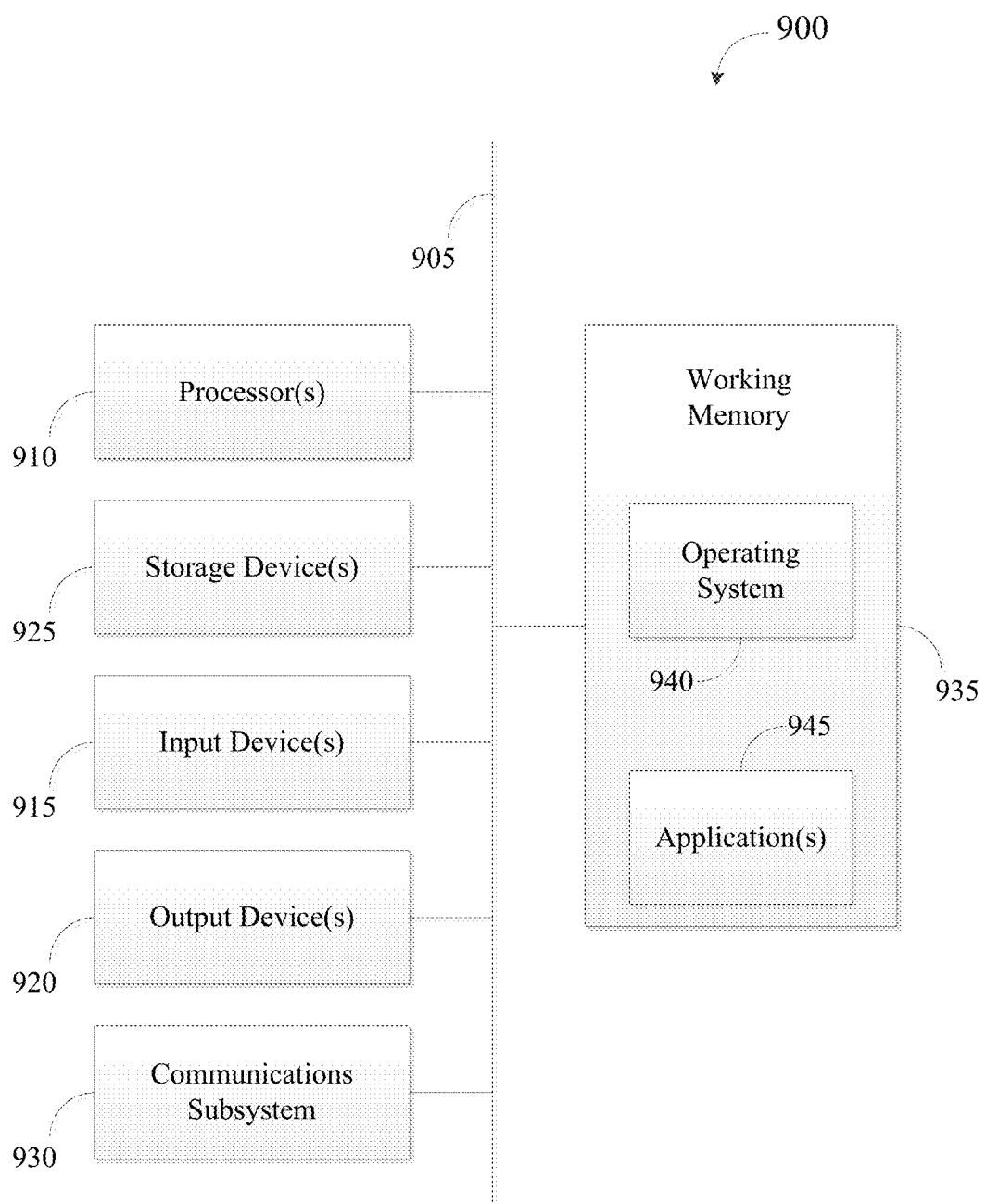
FIG. 9 shows an illustrative computational system for performing functionality to facilitate implementation of embodiments described herein.

The computational system 900, shown in FIG. 9 can be used to perform any of the embodiments of the invention. For example, computational system 900 can be used to execute methods 500 and/or 600. As another example, computational system 900 can be used perform any calculation, identification and/or determination described here. Computational system 900 includes hardware elements that can be electrically coupled via a bus 905 (or may otherwise be in communication, as appropriate). The hardware elements can include one or more processors 910, including without limitation one or more general-purpose processors and/or one or more special-purpose processors (such as digital signal processing chips, graphics acceleration chips, and/or the like); one or more input devices 915, which can include without limitation a mouse, a keyboard and/or the like; and one or more output devices 920, which can include without limitation a display device, a printer and/or the like.

The computational system 900 may further include (and/or be in communication with) one or more storage devices 925, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 900 might also include a communications subsystem 930, which can include without limitation a modem, a network card (wireless or wired), an infrared communication device, a wireless communication device and/or chipset (such as a Bluetooth device, an 802.6 device, a WiFi device, a WiMax device, cellular communication facilities, etc.), and/or the like. The communications subsystem 930 may permit data to be exchanged with a network (such as the network described below, to name one example), and/or any other devices described herein. In many embodiments, the computational system 900 will further include a working memory 935, which can include a RAM or ROM device, as described above.

The computational system 900 also can include software elements, shown as being currently located within the working memory 935, including an operating system 940 and/or other code, such as one or more application programs 945, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 925 described above.

In some cases, the storage medium might be incorporated within the computational system 900 or in communication with the computational system 900. In other embodiments, the storage medium might be separate from a computational system 900 (e.g., a removable medium, such as a compact disc, etc.), and/or provided in an installation package, such that the storage medium can be used to program a general purpose computer with the instructions/code stored thereon. These instructions might take the form of executable code, which is executable by the computational system 900 and/or might take the form of source and/or installable code, which, upon compilation and/or installation on the computational system 900 (e.g., using any of a variety of generally available compilers, installation programs, compression/decompression utilities, etc.) then takes the form of executable code.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Many embodiments of the invention have been described mathematically. In the mathematical nomenclature used herein bold capital letters denote a matrix X, and bold lowercase letters denote a column vector x. $x_i$ represents the $i^{th}$ column of the matrix X. $x_{ij}$ denotes the scalar in the $i^{th}$ row and $j^{th}$ column of the matrix X. All non-bold letters represent scalars. $1_{m \times n}$; $0_{m \times n} \in \mathbb{R}^{m \times n}$ are matrices of ones and zeros. $I_n \in \mathbb{R}^{m \times n}$ is an identity matrix.

$$\|x\|_p = \sqrt[p]{\sum |x_i|^p} \text{ and } \|X\|_p = \sqrt[p]{\sum |x_{ij}|^p}$$

denote the p-norm for vectors and matrices respectively. Vec (X) denotes the vectorization of matrix X. diag(X) is a diagonal matrix whose diagonal elements are x. $X \circ Y$ and $X \otimes Y$ are the Hadamard and Kronecker products of matrices. {i:j} lists the integers, {i, i+1, ..., j-1, j}. eig(X) computes the leading eigen-vector of X.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method comprising:
   receiving a test facial image;
   receiving a plurality of training facial images having a plurality of previously identified facial landmarks;
   identifying a subset of the training facial images that have a greater similarity with the test facial image than the plurality of training facial images not within the subset of training facial images;
   calculating a plurality of shape constraints for each landmark within the subset of training facial images, wherein the plurality of shape constraints comprises a plurality of weights that estimates each landmark location within a given facial image from a plurality of other landmark locations within the given training facial image; and
   identifying landmark locations for the test facial image using the plurality of shape constraints.

2. The method according to claim 1, wherein the calculating a plurality of shape constraints for each landmark within the subset of training facial images comprises identifying a weight associated with each of the plurality of shape constraints, wherein the weight represents the contribution of a landmark in specifying the location of another landmark.

3. The method according to claim 1, wherein the plurality of shape constraints comprise an affine invariant representation of the given landmark in terms of a plurality of other landmarks within the given facial image.

4. The method according to claim 1, wherein the plurality of shape constraints comprise a graphical representation of the given landmark location in terms of the other landmark locations.

5. The method according to claim 1, wherein the subset of training facial images have a greater similarity with the test facial image in at least one of rotation, scale, and translation.

6. A system comprising:
   a database comprising a plurality of training facial images;
   memory;

a processor coupled with the database and the memory, the processor configured to receive a test facial image;

identify a subset of training facial images from the plurality of training facial images, wherein the subset of training facial images have a greater similarity with the test facial image than the plurality of training facial images not within the subset of training facial images, and wherein each training facial image within the subset of training facial images includes a plurality of previously identified facial landmarks; and determine plurality of shape constraints for each landmark within each training facial image within the subset of training facial images, wherein the plurality of shape constraints comprises a plurality of weights that reconstructs each landmark location within a given facial image from a plurality of other landmark locations within the given training facial image.

\* \* \* \* \*